(12) United States Patent
Kuhn et al.

(10) Patent No.: US 7,379,804 B2
(45) Date of Patent: May 27, 2008

(54) OCCUPANT PROTECTION SYSTEM FOR A MOTOR VEHICLE

(75) Inventors: Andreas Kuhn, Kochl (AT); André Neubohn, Wolfsburg (DE); Christian Weiss, Boehmfeld (DE); André Zander, Magdeburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/576,062

(22) PCT Filed: Oct. 14, 2004

(86) PCT No.: PCT/EP2004/011535

§ 371 (c)(1),
(2), (4) Date: Dec. 22, 2006

(87) PCT Pub. No.: WO2005/037611

PCT Pub. Date: Apr. 28, 2005

(65) Prior Publication Data

US 2007/0219692 A1    Sep. 20, 2007

(30) Foreign Application Priority Data

| Oct. 17, 2003 | (DE) | ................................ 103 48 997 |
| Oct. 17, 2003 | (DE) | ................................ 103 48 998 |
| Oct. 17, 2003 | (DE) | ................................ 103 48 999 |
| Jan. 31, 2004 | (DE) | ........................ 10 2004 004951 |

(51) Int. Cl.
   *B60R 22/00* (2006.01)
(52) U.S. Cl. ........................... 701/45; 701/36; 701/46; 180/268; 280/734

(58) Field of Classification Search .................. 701/36, 701/37, 38, 45, 46; 280/734, 735; 180/268, 180/282
See application file for complete search history.

(56) References Cited

U.S. PATENT DOCUMENTS

| 5,583,771 | A | 12/1996 | Lynch et al. |
| 5,684,701 | A | 11/1997 | Breed |
| 6,532,508 | B2 | 3/2003 | Heckel et al. |
| 6,600,984 | B1 | 7/2003 | Holzner et al. |
| 2002/0052679 | A1 | 5/2002 | Kuhn et al. |
| 2002/0099486 | A1* | 7/2002 | Nagao et al. .................. 701/45 |
| 2002/0147533 | A1 | 10/2002 | Foo et al. |
| 2003/0074111 | A1 | 4/2003 | Ugusa et al. |
| 2004/0031637 | A1 | 2/2004 | Kocher |
| 2004/0117089 | A1 | 6/2004 | Grotendick et al. |

FOREIGN PATENT DOCUMENTS

| DE | 198 54 380 | 5/2000 |
| DE | 100 35 505 | 1/2002 |
| DE | 100 40 111 | 2/2002 |
| DE | 100 16 142 | 4/2002 |
| DE | 101 03 661 | 8/2002 |
| DE | 102 23 522 | 4/2003 |
| EP | 0 665 140 | 8/1995 |
| WO | WO 2004/054850 | 7/2004 |

* cited by examiner

*Primary Examiner*—Gertrude A. Jeanglaude
(74) *Attorney, Agent, or Firm*—Kenyon & Kenyon LLP

(57) ABSTRACT

An occupant protection system for a motor vehicle includes at least one crash sensor for measuring a motion variable. The occupant protection system includes an occupant protection device, controlled by an ignition signal, and a control device for determining the ignition signal subject to an average time value of the motion variable measured by the crash sensor during at least one first time interval.

17 Claims, 9 Drawing Sheets

OCCUPANT PROTECTION SYSTEM FOR A MOTOR VEHICLE

FIELD OF THE INVENTION

The present invention relates to an occupant protection system for a motor vehicle. Such an occupant protection system may include an airbag and/or a belt tensioner.

BACKGROUND INFORMATION

Airbag systems are described, for example, in the article "Hardware and Mechanics of Real Airbag Control Systems" published on the Internet page www.informatik.uni-dortmund.de/airbag/seminarphase/hardware_vortrag.pdf.

U.S. Pat. No. 5,583,771, U.S. Pat. No. 5,684,701 and U.S. Pat. No. 6,532,508 describe the triggering of an airbag by a neural network as a function of an output signal of an acceleration sensor.

German Published Patent Application No. 198 54 380 describes a method for detecting the severity of a vehicle collision, where the output signals of a plurality of acceleration sensors are supplied to a neural network. In the method, the start of the evaluation of the acceleration-sensor output signals is determined by a trigger signal, which is output by an acceleration sensor when it output signal exceeds a predefined threshold value. This acceleration sensor causes the other acceleration sensors to supply the specific output signal at one and the same time. It is also provided that the output signals of the acceleration sensors be integrated one or two times.

German Published Patent Application No. 100 35 505 describes a method, in which the future time characteristic of the output signal of an acceleration sensor is predicted with the aid of a neural network on the basis of the acceleration-sensor signals at least one defined time.

German Published Patent Application No. 100 40 111 describes a method for producing a triggering decision for restraining devices in a vehicle, where the difference of measured acceleration values is calculated and the magnitude of the difference is subsequently integrated. The integral is compared to at least one threshold value. If the integral does not exceed this threshold value by a predefined time, then the position of a triggering threshold for the measured acceleration or for a speed change derived from it is modified in such a manner, that the triggering sensitivity becomes lower.

Described in German Published Patent Application No. 101 03 661 is a method for sensing lateral impact in a motor vehicle; acceleration sensors, from whose output signals the difference is calculated, being situated on the left and right sides of the vehicle. The differential acceleration signal is integrated or summed up. For the purpose of side-impact sensing, the differential speed signal is compared to a threshold value, which is calculated as a function of the differential acceleration signal.

SUMMARY

Example embodiments of the present invention may provide occupant protection systems for a motor vehicle, e.g., an occupant protection system including an airbag and/or a belt tensioner. In so doing, it may be provided for the triggering of such an occupant protection system for a motor vehicle to be particularly precise.

An occupant protection system for a motor vehicle may include at least one crash sensor for measuring a motion variable of the motor vehicle, the occupant protection system including an occupant protection device controllable via an ignition signal, and a control unit for ascertaining or generating the ignition signal as a function of a time average, over at least a first time interval, of the motion variable measured by the crash sensor, and, e.g., as a function of a time average of the motion variable measured by the crash sensor, over a second time interval different from the first time interval.

An occupant protection device within the present context may include, e.g., an airbag and/or a belt tensioner.

An average value within present context may be an arithmetic mean or a weighted average. In the case of such a weighted average, e.g., more recent values of the motion variable in the relevant time interval may be more heavily weighted than older values of the motion variable in the relevant time interval. An average value within the present context may also be a value proportional to an average value. The average value may be a value proportional to the arithmetic mean. In this context, the average value may be a value proportional to the integral of the motion variable in the relevant time interval or the sum of sampled values of the motion variable in the relevant time interval.

A motion variable of the motor vehicle within the present context may be an acceleration, a speed, or a displacement, or a variable derived from one of these variables. In this context, the motion variable may be an acceleration.

A crash sensor within the present context may be an acceleration sensor for measuring an acceleration in one or more directions. A crash sensor within the present context may also be a radar device, an infrared set-up, or a camera. In this case, a motion variable of the motor vehicle may be a distance of the motor vehicle from an obstacle, the first or second derivative of this distance, or another similar variable. A crash sensor within the present context may also be a sensor for measuring a deformation of the motor vehicle. Such a sensor may be a fiber-optic sensor or a sensor described in German Published Patent Application No. 100 16 142. In this case, a motion variable of the motor vehicle may be a deformation of the motor vehicle, the first or second derivative of this deformation, or another similar variable.

An ignition signal within the present context may be a binary signal, which indicates if an occupant protection device, such as an airbag and/or a belt tensioner, should be triggered. Such an ignition signal within the present context may be a "FIRE/NO-FIRE" signal described in German Published Patent Application No. 100 35 505. An ignition signal within the present context may also be a more complex signal, which indicates the degree (e.g., stage 1 or stage 2) to which an airbag should be fired. In addition, such an ignition signal within the present context may be a crash-severity parameter or an occupant acceleration or loading described in German Published Patent Application No. 100 35 505. An ignition signal within the present context may be, or include, an information item indicating the location and/or the direction of a collision.

A second time interval different from a first time interval may differ from the first time interval in its length and/or its position.

The ignition signal may be ascertainable by the control unit as a function of time averages of the motion variable measured by the crash sensor in two to twenty, e.g., in two to ten, different time intervals. The ignition signal may be ascertainable by the control unit as a function of time averages of the motion variable measured by the crash sensor in two to five different time intervals. Different time intervals within the present context may differ from each other in the length and/or in the position.

The time intervals may be between 1 ms and 200 ms long, e.g., between 4 ms and 32 ms long, and, e.g., between 8 ms and 24 ms long. The time intervals may be the same length, or they may vary in length.

At least two, e.g., adjacent, time intervals may be staggered by between 1 ms and 50 ms, e.g., by between 2 ms and 16 ms. All adjacent time intervals may each be offset from each other by between 1 ms and 50 ms, e.g., by between 2 ms and 16 ms.

The occupant protection system may include at least one additional crash sensor for measuring a motion variable of the motor vehicle, the ignition signal also being ascertainable by the control unit as a function of at least one time average of the motion variable measured by the additional crash sensor over a time interval. The additional crash sensor may be positioned more than 0.5 m away from the crash sensor mentioned at the outset.

In a motor vehicle, e.g., a motor vehicle including an occupant protection system that has one or more of the above-mentioned features, the motor vehicle the motor vehicle may include at least one crash sensor for measuring a motion vehicle of the motor vehicle and an occupant protection device controllable via an ignition signal, the motor vehicle including a control unit for ascertaining or generating the ignition signal as a function of a time average of the motion variable measured by the crash sensor over at least one first time interval, and, e.g., as a function of a second time interval of the motion variable measured by the crash sensor over a second time interval different from the first time interval.

In a method for operating an occupant protection system for a motor vehicle, e.g., by a method for operating an occupant protection system, having one or more of the above-mentioned features, the occupant protection system includes an occupant protection device controllable via an ignition signal, and the ignition signal being ascertained as a function of a time average of a measured motion variable over at least one first time interval, and, e.g., as a function of a time average of the measured motion variable over a second time interval different from the first time interval.

A motor vehicle within the present context may include, e.g., a land vehicle that may be used individually in road traffic. For example, motor vehicles in the present context are not restricted to land vehicles having an internal combustion engine.

Further features and details of exemplary embodiments of the present invention are described in more detail below with reference to the appended Figures.

DETAILED DESCRIPTION

Figure 1:
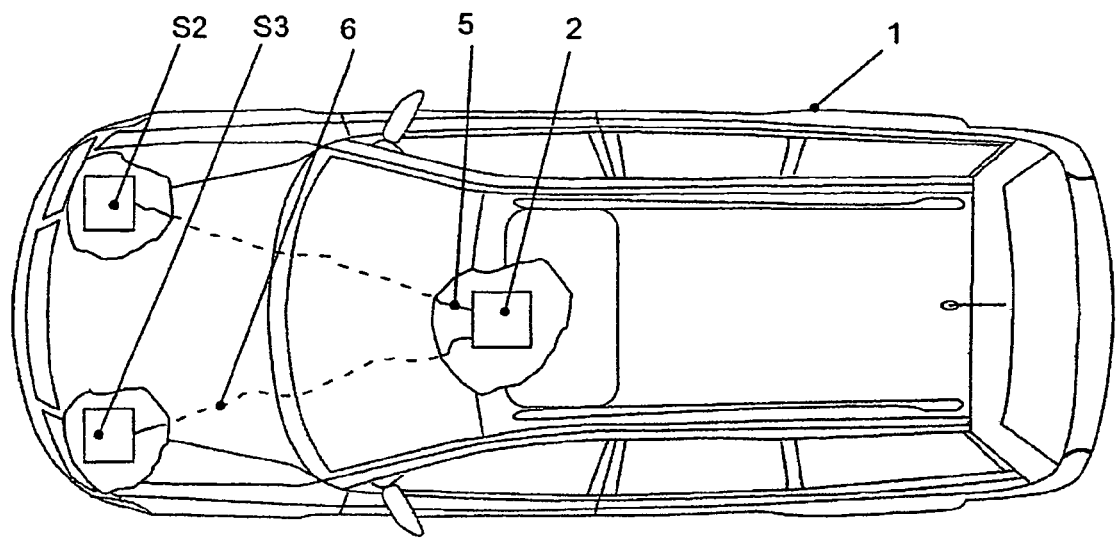
FIG. 1 is a plan view of a motor vehicle.
Figure 2:
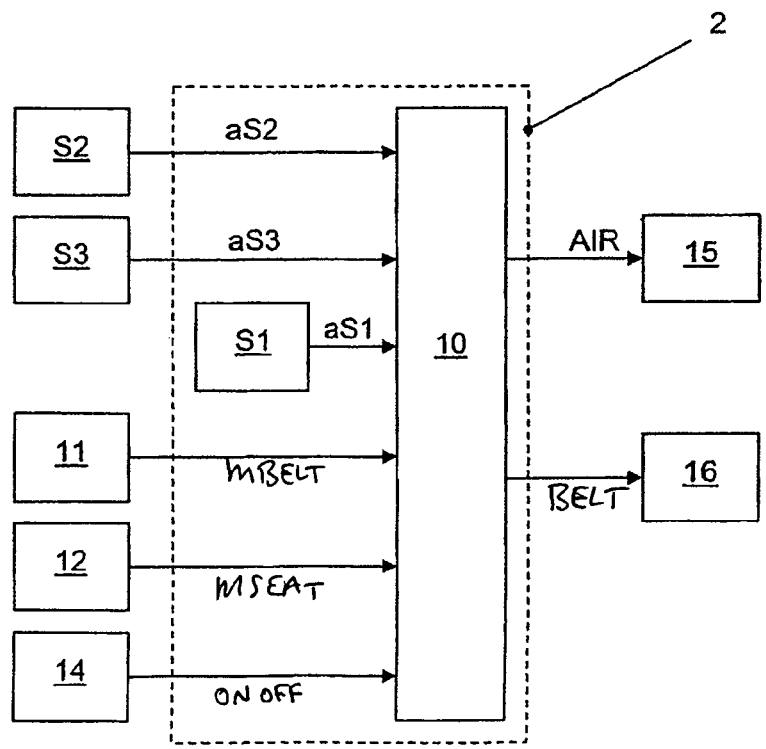
FIG. 2 illustrates an exemplary embodiment of an occupant protection system.

FIG. 1 is a plan view of a motor vehicle 1 having an occupant protection system, which is illustrated in FIG. 2 in the form of a block diagram. The occupant protection system includes at least an airbag 15, see, e.g., FIG. 2, and/or a belt tensioner 16, see, e.g., FIG. 2. The occupant protection system additionally includes a control unit 2 for triggering airbag 15 and/or belt tensioner 16, as well as a crash sensor S2 integrated into the right front end of motor vehicle 1 and a crash sensor S3 integrated into the left front end of motor vehicle 1. Crash sensors S2 and S3 are connected to control unit 2 by leads 5 and 6.

Crash sensors S2 and S3, as well as an additional crash sensor S1 integrated into control unit 2, as illustrated in FIG. 2, may take the form of acceleration sensors. Suitable acceleration sensors are described, for example, in chapter 3.2, 'Acceleration Sensor,' of the article "Hardware and Mechanics of Real Airbag Control Systems" published on the Internet page www.informatik.uni-dortmund.de/airbag/seminarphase/hardware_vortrag.pdf. Examples of suitable acceleration sensors include Bosch SMB060, Bosch PAS3 or Bosch UPF1. A suitable acceleration sensor may include, for example, a Bessel low-pass filter having a cutoff frequency of, e.g., 400 Hz. Crash sensors S1, S2, and S3 supply acceleration values aS1, aS2, and aS3, respectively, as output signals.

The occupant protection system additionally includes a belt sensor 11 for detecting if a seat belt is being used, and for outputting a corresponding belt information item MBELT. The occupant protection system further includes a seat-occupancy sensor 12 for detecting if, or how, a seat is occupied, and for outputting a corresponding seat-occupancy information item MSEAT. An example of a suitable seat-occupancy sensor is a pressure sensor integrated into the seat. Also suitable is an infrared scanning system described in chapter 3.3, "Interior Sensing," of the article "Hardware and Mechanics of Real Airbag Control Systems" published on the Internet page www.informatik.uni-dortmund.de/airbag/seminarphase/hardware_vortrag.pdf. Infrared scanning and fuzzy logic not only allow seat occupancy to be detected, but also allow a determination as to whether the seat occupant is an object, such as a purse, or a person. To this end, a line of, e.g., eight or more light-emitting diodes above the seat emit infrared light, and a CCD matrix of 64 pixels records the scene illuminated in this manner. These charged coupled devices, abbreviated CCD, are made up of photodiodes and amplifier elements in matrix configurations. In this context, incident light releases charge carriers in each instance. A signal generated in this manner is amplified, processed, and stored. This procedure is repeated at different angles, and the seat is scanned in this manner. Image-processing algorithms and fuzzy-logic algorithms detect contours of objects and persons from these signals.

It may also be provided that the occupant-protection system include a control element 14 for activating or deactivating airbag 15. A corresponding switching signal is designated by reference character ONOFF.

Control unit 2 includes a control module 10 for calculating and outputting an ignition signal AIR fur airbag 15 and/or an ignition signal BELT for belt tensioner 16 as a function of acceleration values aS1, aS2, and aS3, belt information item MBELT, seat-occupancy information item MSEAT, and switching signal ONOFF.

Figure 3:
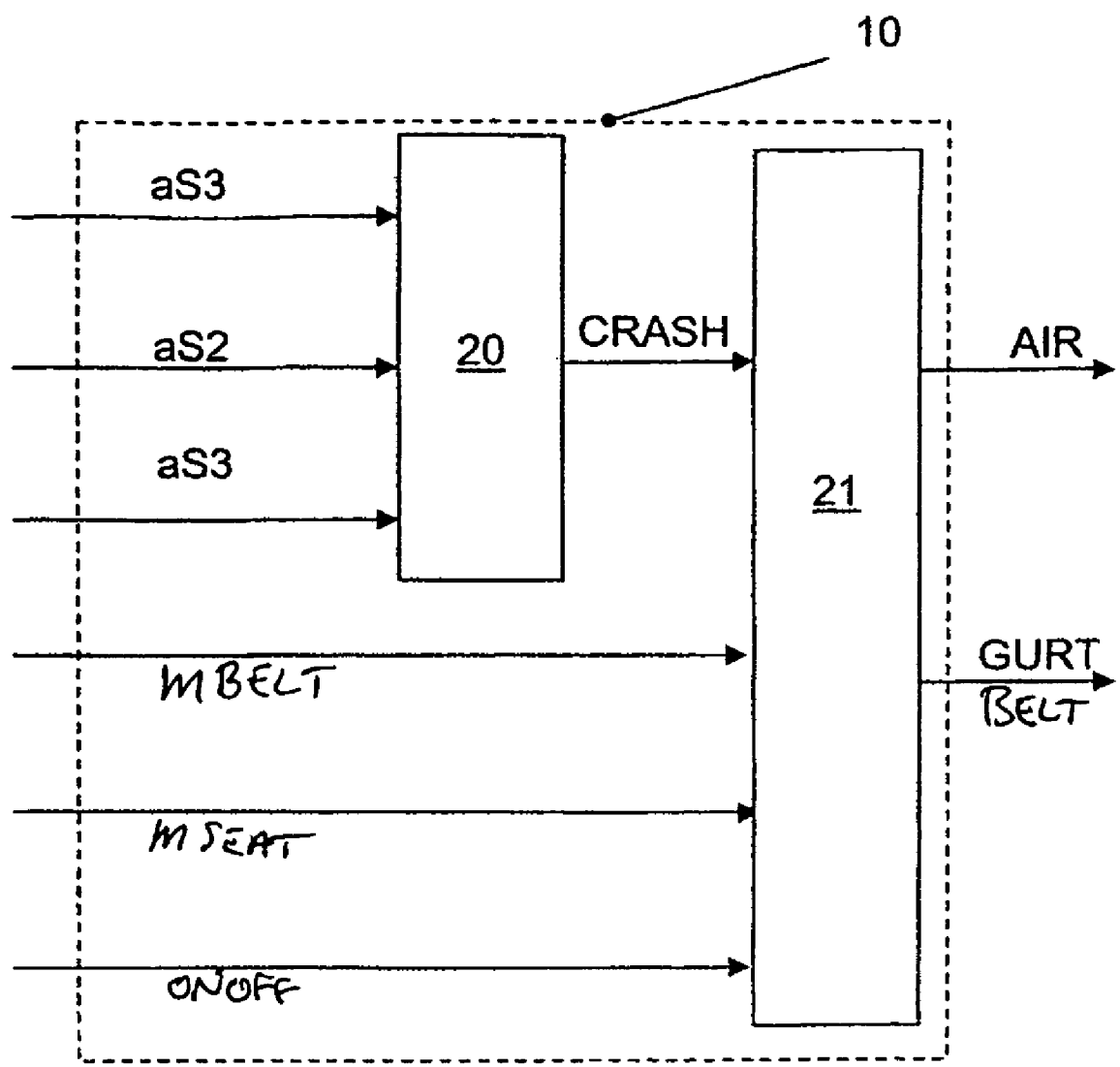
FIG. 3 illustrates an exemplary embodiment of a control module.

FIG. 3 illustrates an exemplary embodiment of control module 10. Control module 10 includes a triggering module 20 for calculating and outputting an ignition recommendation CRASH as a function of acceleration values aS1, aS2, and aS3. Control module 10 additionally includes a firing table 21 for calculating and outputting ignition signal AIR for airbag 15 and/or ignition signal BELT for belt tensioner 16 as a function of ignition recommendation CRASH, belt information item MBELT, seat-occupancy information item MSEAT, and switching signal ONOFF. Thus, it may be provided that ignition signal AIR only be equal to ignition recommendation CRASH, when a corresponding seat is occupied by a person of a specific size, and that ignition signal AIR otherwise be equal to 0.

Both ignition recommendation CRASH and ignition signals AIR and BELT may be ignition signals. Both ignition recommendation CRASH and ignition signals AIR and BELT may be a binary signal, e.g., in accordance with the "FIRE/NO-FIRE" signal described in German Published Patent Application No. 100 35 505, which indicates whether an occupant protection device, such as an airbag and/or a belt tensioner, should be triggered. Both ignition recommendation CRASH and ignition signals AIR and BELT may also be a more complex signal. Both ignition recommendation CRASH and ignition signal AIR may be, for example, a more complex signal which indicates the degree (e.g., stage 1 or stage 2) to which airbag 15 should be fired. Both ignition recommendation CRASH and ignition signal AIR may additionally include, for example, a crash-severity parameter described in German Published Patent Application No. 100 35 505 or an occupant acceleration or occupant loading. It may be provided that both ignition recommendation CRASH and ignition signals AIR and BELT may indicate the location and/or the direction of a collision.

Figure 4:
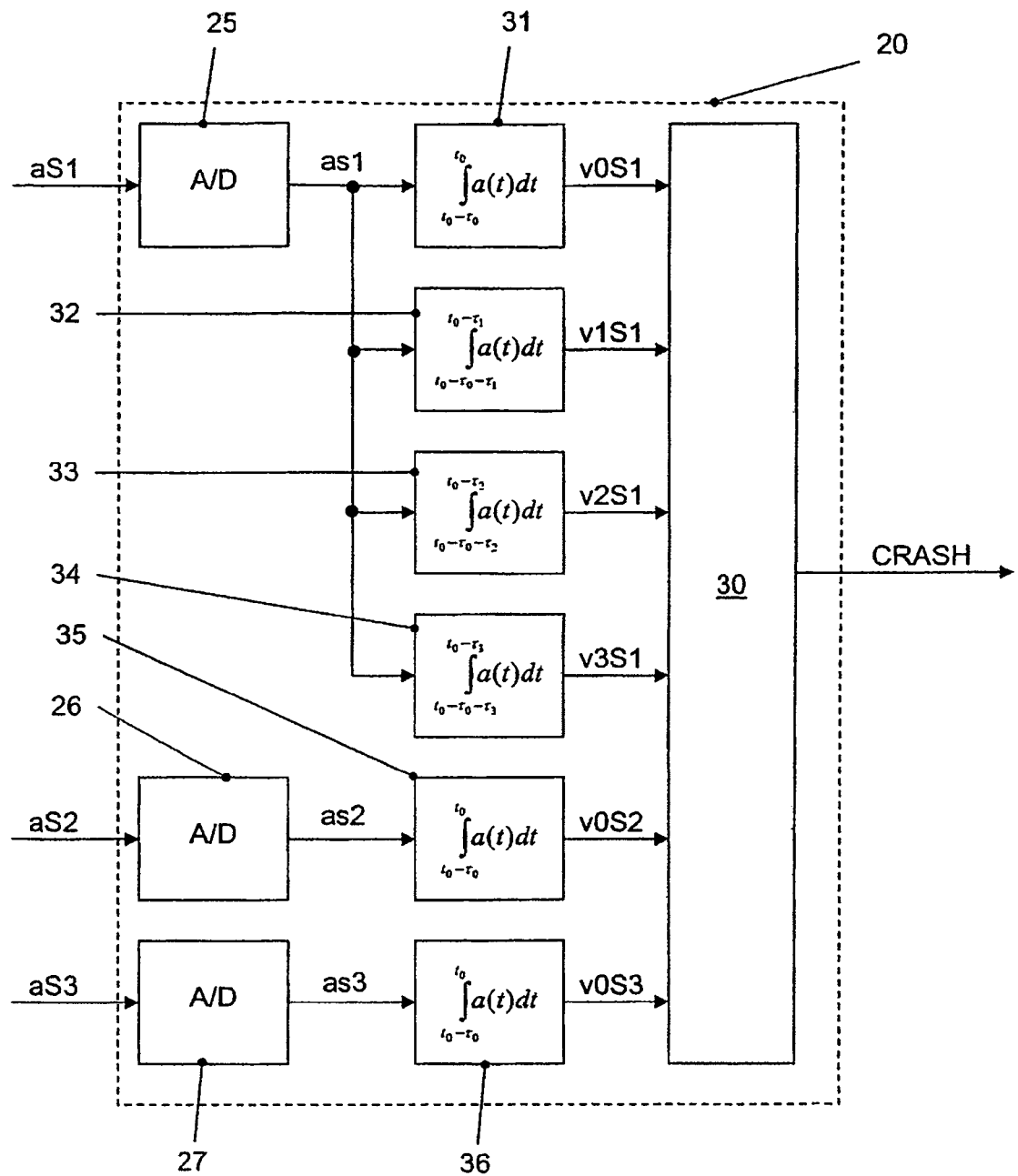
FIG. 4 illustrates an exemplary embodiment of a triggering module.

FIG. 4 illustrates an exemplary embodiment of triggering module 20. Triggering module 20 includes an analog-to-digital converter 25 (analog-to-digital converter) for sampling acceleration value aS1 and outputting a sampled acceleration value aS1, an analog-to-digital converter 26 for sampling acceleration value aS2 and outputting a sampled acceleration value aS2, and an analog-to-digital converter 27 for sampling acceleration value aS3 and outputting a sampled acceleration value aS3.

The sampling frequency of the $\Delta t$ of analog-to-digital converters 25, 26, and 27 may be, for example, 4 kHz. Triggering module 20 additionally includes (digital) integrators 31, 32, 33, 34, 35, and 36.

Figure 5:
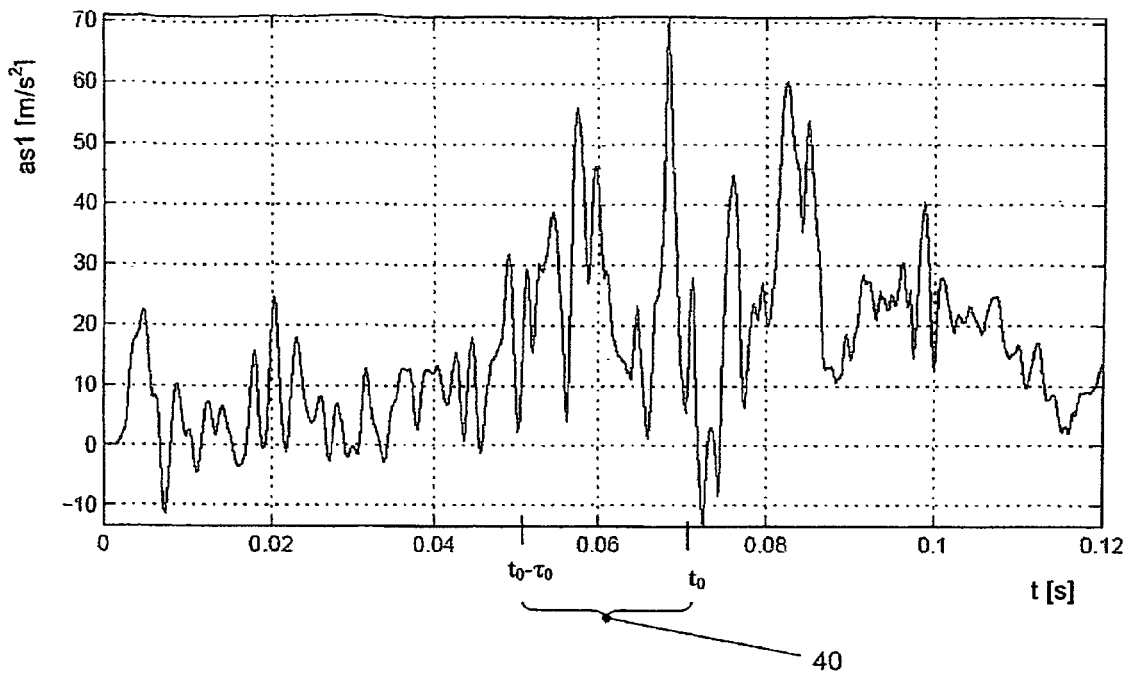
FIG. 5 illustrates an exemplary embodiment of an output signal of a crash sensor.

Using integrator 31, a pseudospeed value v0S1 at time $t_0$ is ascertained according to $$v0S1 = \int_{t_0-\tau_0}^{t_0} as1 \cdot dt,$$

where $\tau 0$ is the length of a time interval $[t_0-\tau_0, t_0]$ or 40 (cf., FIG. 5). Time $t_0$ designates the current time, i.e., the current value of time t.

Using integrator 32, a pseudospeed value v1S1 at a time $t_0-\tau_1$ is ascertained according to $$v1S1 = \int_{t_0-\tau_0-\tau_1}^{t_0-\tau_1} as1 \cdot dt.$$

Using integrator 33, a pseudospeed value v2S1 at a time $t_0-\tau_2$ is ascertained according to $$v2S1 = \int_{t_0-\tau_0-\tau_2}^{t_0-\tau_2} as1 \cdot dt.$$

Using integrator 34, a pseudospeed value v3S1 at a time $t_0-\tau_3$ is ascertained according to $$v3S1 = \int_{t_0-\tau_0-\tau_3}^{t_0-\tau_3} as1 \cdot dt.$$

Using integrator 35, a pseudospeed value v0S2 at time $t_0$ is ascertained according to $$v0S2 = \int_{t_0-\tau_0}^{t_0} as2 \cdot dt.$$

Using integrator 36, a pseudospeed value v0S3 at time $t_0$ is ascertained according to $$v0S3 = \int_{t_0-\tau_0}^{t_0} as3 \cdot dt.$$

Figure 6:
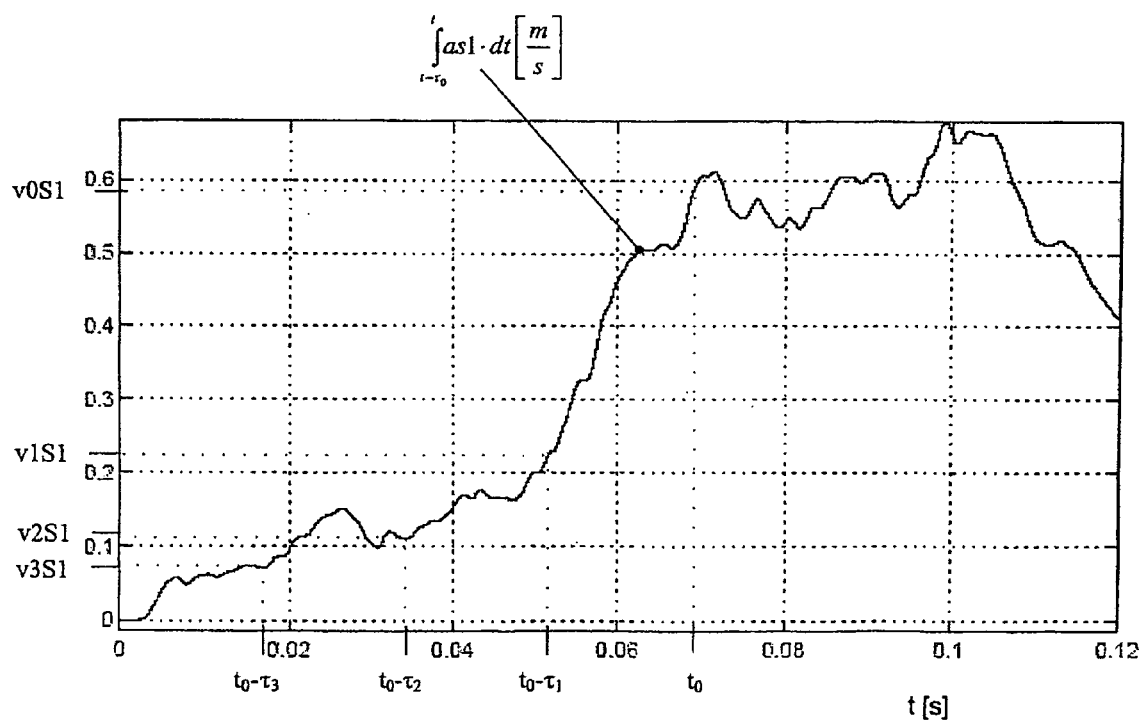
FIG. 6 illustrates the integral of the output signal illustrated in FIG. 5, in one time interval.

FIG. 5 and FIG. 6 illustrate the effect of integrators 31, 32, 33, 34, 35, and 36. In this context, FIG. 5 illustrates an example of the curve of (sampled) acceleration value as1 versus time t in the event of a frontal collision of motor vehicle 1 with an obstacle. FIG. 6 illustrates an example of a curve of pseudospeed value v0S1 for $\tau_0$=24 ms.

In the exemplary embodiment illustrated in FIG. 6, $\tau_1$ is 17 ms, $\tau_2$ is 34 ms, and $\tau_3$ is 51 ms. $\tau_1$ may be 8 ms, $\tau_2$ may be 16 ms, and $\tau_3$ may be 24 ms.

Pseudospeed values v0S1, v1S1, v2S1, v3S1, v0S2, and v0S3 are examples of time averages within the present context.

Triggering module 20 further includes a trigger generator 30 for generating trigger recommendation CRASH. Trigger generator 30 may take the form of a neural network, as illustrated in FIG. 7 in an exemplary embodiment.

Figure 7:
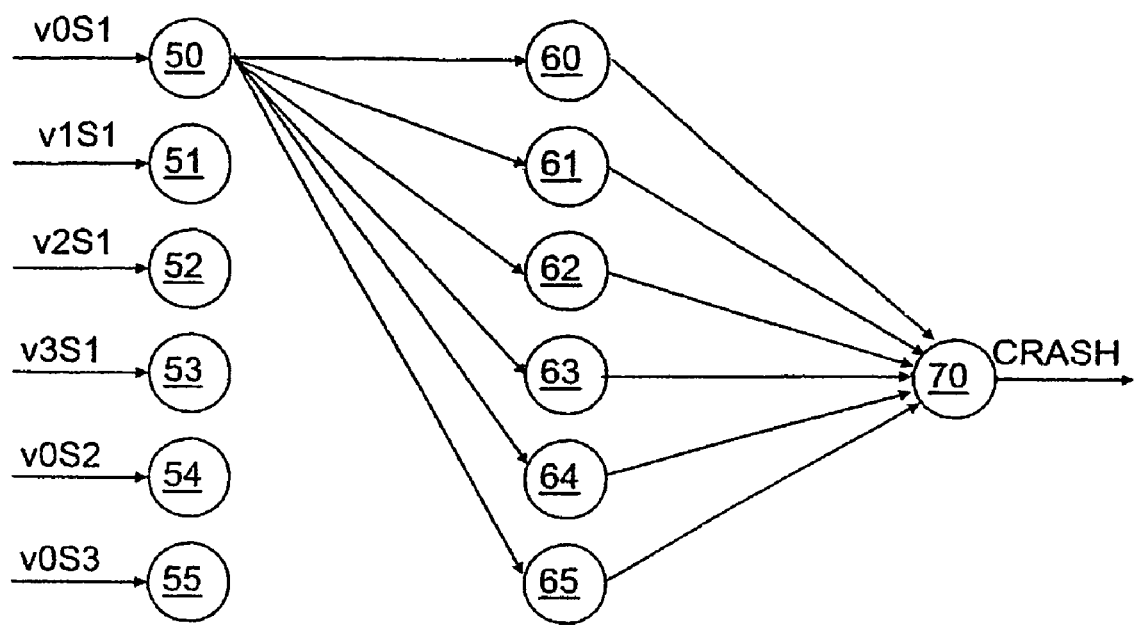
FIG. 7 illustrates an exemplary embodiment of a neural network.

The neural network illustrated in FIG. 7 includes six input nodes 50, 51, 52, 53, 54, 55, six covered nodes 60, 61, 62, 63, 64, 65, and an output node 70, each input node 50, 51, 52, 53, 54, 55 being connected to each covered node 60, 61, 62, 63, 64, 65, and each covered node 60, 61, 62, 63, 64, 65 being connected to output node 70. In FIG. 7, however, not all of the connections between input nodes 50, 51, 52, 53, 54, 55 and covered nodes 60, 61, 62, 63, 64, 65 are illustrated for reasons of clarity.

Pseudospeed value v0S1 is the input variable input into input node 50, pseudospeed value v1S1 is the input variable input into input node 51, pseudospeed value v2S1 is the input variable input into input node 52, pseudospeed value v3S1 is the input variable input into input node 53, pseudospeed value v0S2 is the input variable input into input node 54, and pseudospeed value v0S3 is the input variable input into input node 55.

The output variable from output node 70 is ignition recommendation CRASH.

Details regarding neural networks may be found in U.S. Pat. No. 5,583,771, U.S. Pat. No. 5,684,701, and the documents "Techniques And Application Of Neural Networks", Taylor, M. and Lisboa, Ellis Horwood, West Sussex, England, 1993, "Naturally Intelligent Systems", Caudill, M. and Butler, G., MIT Press, Cambridge, 1990, and "Digital Neural Networks", Kung, S. Y., PTR Prentice Hall, Englewood Cliffs, N.J., 1993, cited in U.S. Pat. No. 5,684,701.

TABLE 1

```
/* Evaluation function */
int evaluate__Action(double *x)
{
  int CRASH;
  if (v0S3 < δ_v0S3 ) {
    if (v0S2 < δ_v0S2 ) {
      if (v2S1 < δ_v2S1 ) {
        if (v0S1 < δ_v0S1 ) {
          CRASH = 0;
        } else {
          if (v0S3 < δ_v0S3,2 ) {
            CRASH = 0;
          } else {
            if (v0S1 < δ_v0S1,2 ) {
              if (v1S1 < δ_v1S1 ) {
                CRASH = 1;
              } else {
                CRASH = 0;
              }
            } else {
              CRASH = 1;
            }
          }
        }
      } else {
        if (v0S2 < δ_v0S2,2 ) {
          CRASH = 0;
        } else {
          if (v0S3 < δ_v0S3,3 ) {
            CRASH = 0;
          } else {
            CRASH = 1;
          }
        }
      }
    } else {
      CRASH = 1;
    }
  } else {
    CRASH = 1;
  }
  return (CRASH);
}
```

As an alternative, trigger generator 30 may take the form of a sequence of comparisons to limiting values. Table 1 illustrates such a sequence of comparisons to limiting values, the code illustrated in Table 1 having been automatically generated by a learning process. For the code illustrated in Table 1, $\tau_1$ is 4 ms, $\tau_2$ is 8 ms, and $\tau_0$ is 24 ms.

Figure 8:
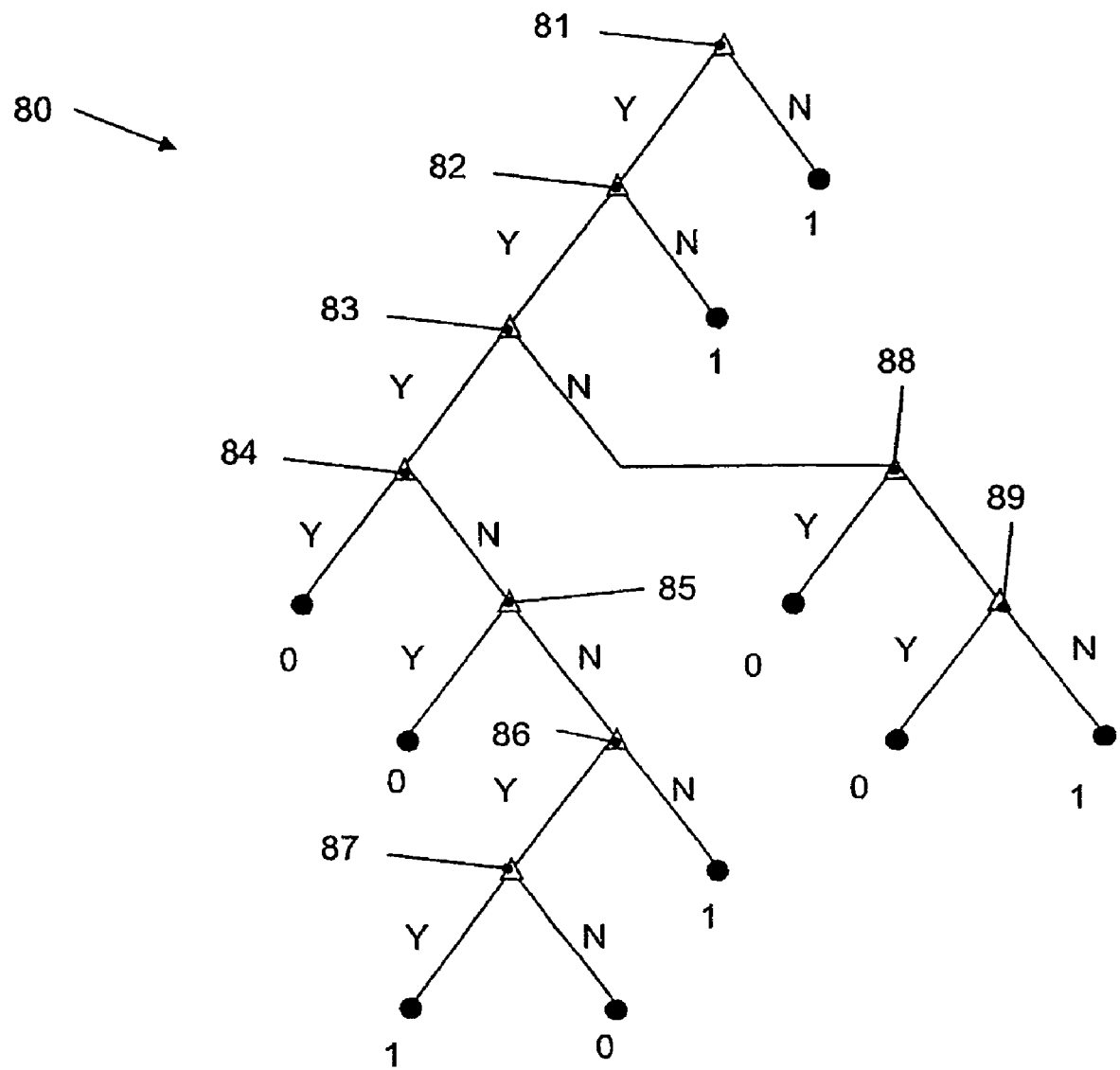
FIG. 8 illustrates an exemplary embodiment of a decision tree.

FIG. 8 illustrates the code of Table 1 represented as a decision tree 80. In this context, reference numeral 81 denotes the inquiry as to whether v0S3 is less than a limiting value $\delta_{v0S3}$.

Reference numeral 82 denotes the inquiry as to whether v0S2 is less than a limiting value $\delta_{v0S2}$.

Reference numeral 83 denotes the inquiry as to whether v2S1 is less than a limiting value $\delta_{v2S1}$.

Reference numeral 84 denotes the inquiry as to whether v0S1 is less than a limiting value $\delta_{v0S1}$.

Reference numeral 85 denotes the inquiry as to whether v0S3 is less than a limiting value $\delta_{v0S3,2}$.

Reference numeral 86 denotes the inquiry as to whether v0S1 is less than a limiting value $\delta_{v0S1,2}$.

Reference numeral 87 denotes the inquiry as to whether v1S1 is less than a limiting value $\delta_{v1S1}$.

Reference numeral 88 denotes the inquiry as to whether v0S2 is less than a limiting value $\delta_{v0S2,2}$.

Reference numeral 89 denotes the inquiry as to whether v0S3 is less than a limiting value $\delta_{v0S3,3}$.

As illustrated in FIG. 8 and Table 1, trigger generator 30 disregards pseudospeed value v3S1. This is taken into account in the learning process, but is disregarded by the learning algorithm for generating the code according to Table 1.

Figure 9:
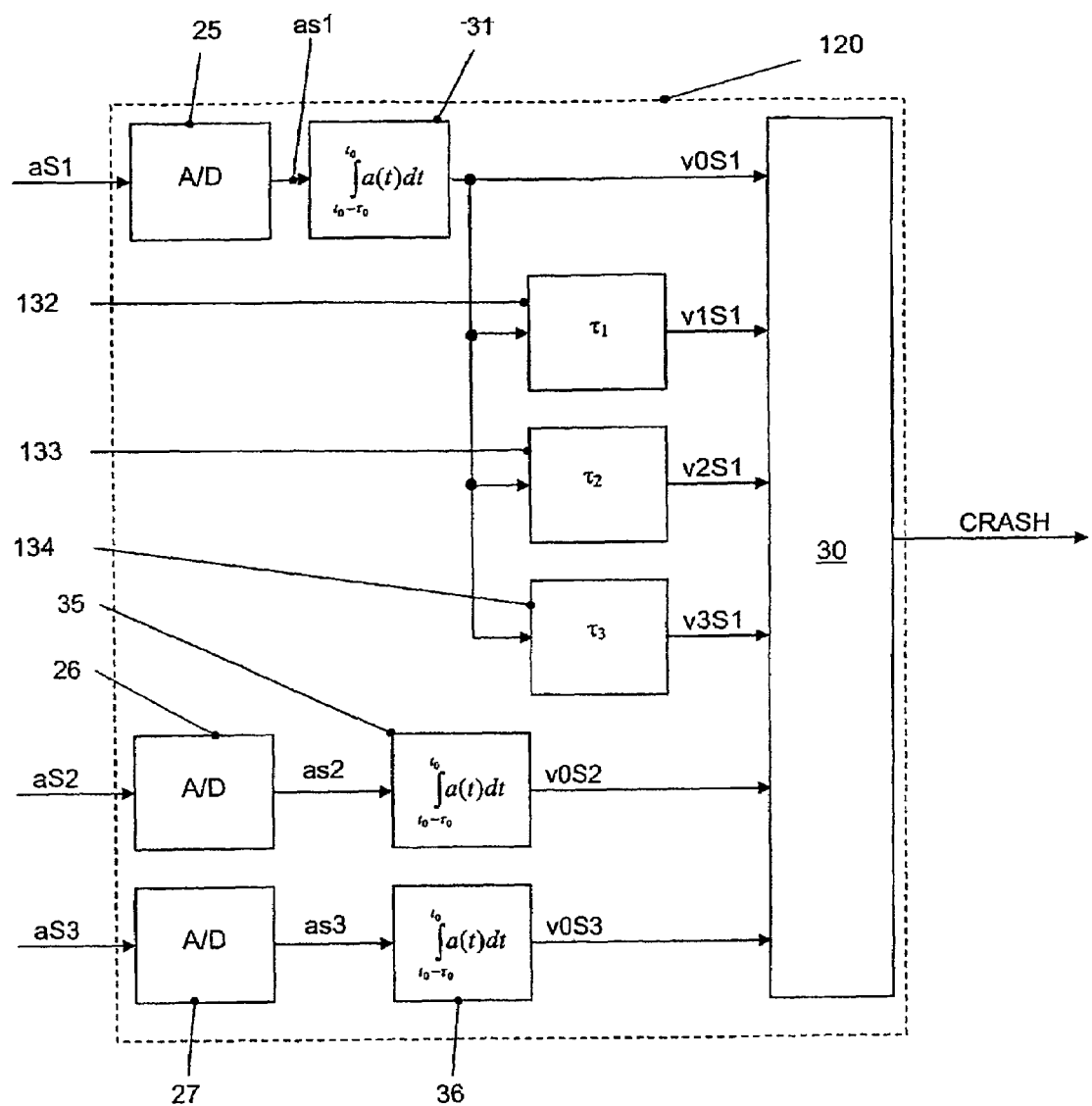
FIG. 9 illustrates an exemplary embodiment of a triggering module.

FIG. 9 illustrates an exemplary embodiment of a triggering module 120 that is an alternative to triggering module 20. In this context, integrators 32, 33, and 34 are replaced by lag elements 132, 133, and 134, which are positioned such that pseudospeed value v1S1 results as pseudospeed value v0S1 delayed by time $\tau_1$, pseudospeed value v2S1 results as pseudospeed value v0S1 delayed by time $\tau_2$, and pseudospeed value v3S1 results as pseudospeed value v0S1 delayed by time $\tau_3$.

One example of a possible (simple) implementation of integrator 31 (and appropriately adapted for integrators 32, 33, and 34) is $$vS1(i) = c \cdot \Delta t \sum_{j=i-\frac{t_0}{\Delta t}}^{i} as1(j),$$

where i is a running index for specifying current time $t_0$ and is a constant. In this case, pseudospeed values v0S1, v1S1, v2S1, and v3S1 are yielded, for example, in accordance with the following relationships:

$$v0S1 = vS1(i)$$

$$v1S1 = vS1\left(i - \frac{\tau_1}{\Delta t}\right)$$

$$v2S1 = vS1\left(i - \frac{\tau_2}{\Delta t}\right)$$

$$v3S1 = vS1\left(i - \frac{\tau_3}{\Delta t}\right)$$

Figure 10:
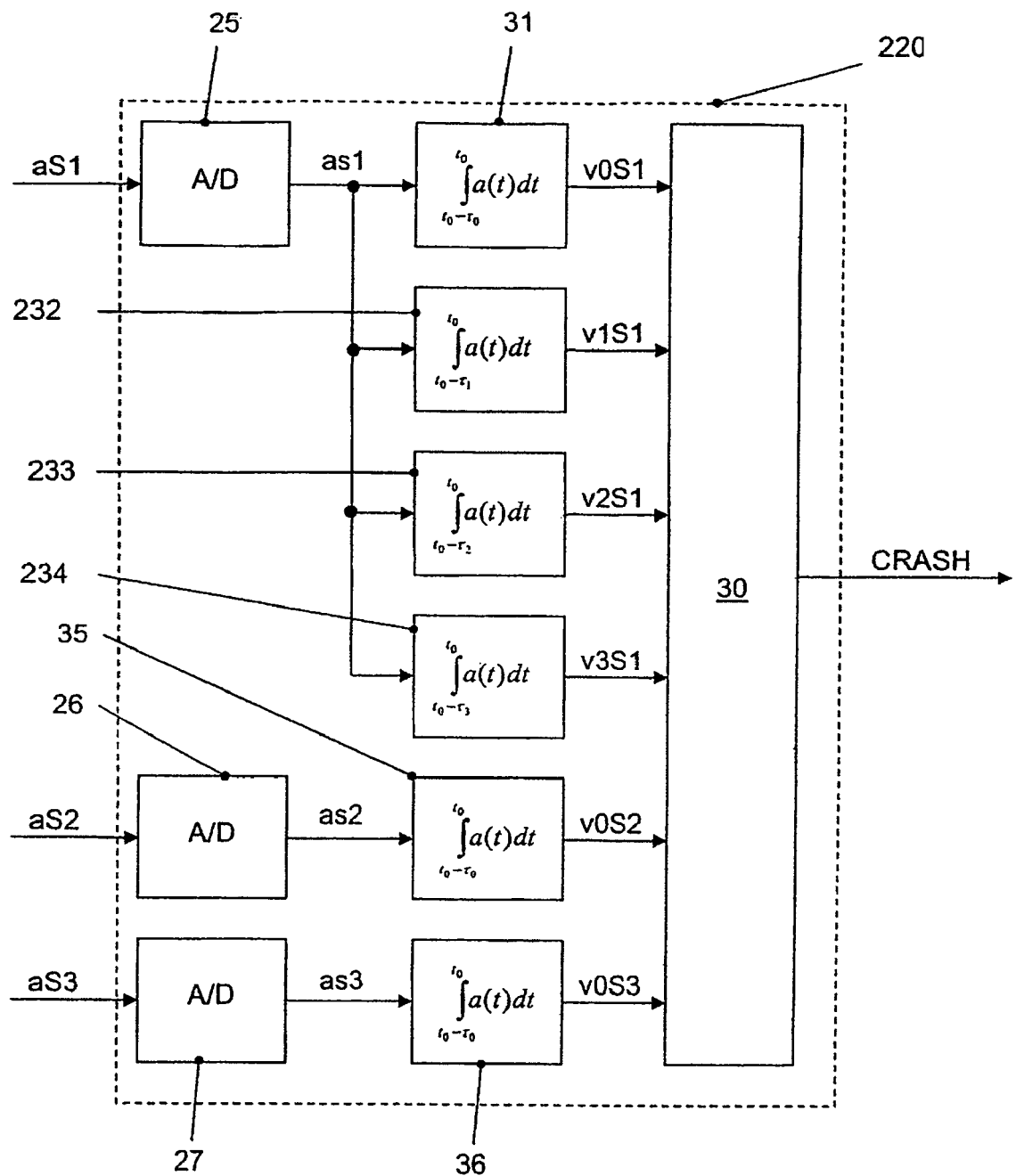
FIG. 10 illustrates an exemplary embodiment of a triggering module.

FIG. 10 illustrates an exemplary embodiment of a triggering module 220 that is an alternative to triggering module 20. In this context, integrators 32, 33, and 34 are replaced by integrators 232, 233, and 234. In this context, pseudospeed value v1S1 is ascertained via integrator 232 according to $$v1S1 = \int_{t_0-\tau_1}^{t_0} as1 \cdot dt.$$

Using integrator 233, a pseudospeed value v2S1 at time $t_0$ is ascertained according to $$v2S1 = \int_{t_0-\tau_2}^{t_0} as1 \cdot dt.$$

Using integrator 234, a pseudospeed value v3S1 at a time $t_0$ is ascertained according to $$v3S1 = \int_{t_0-\tau_3}^{t_0} as1 \cdot dt.$$

Figure 11:
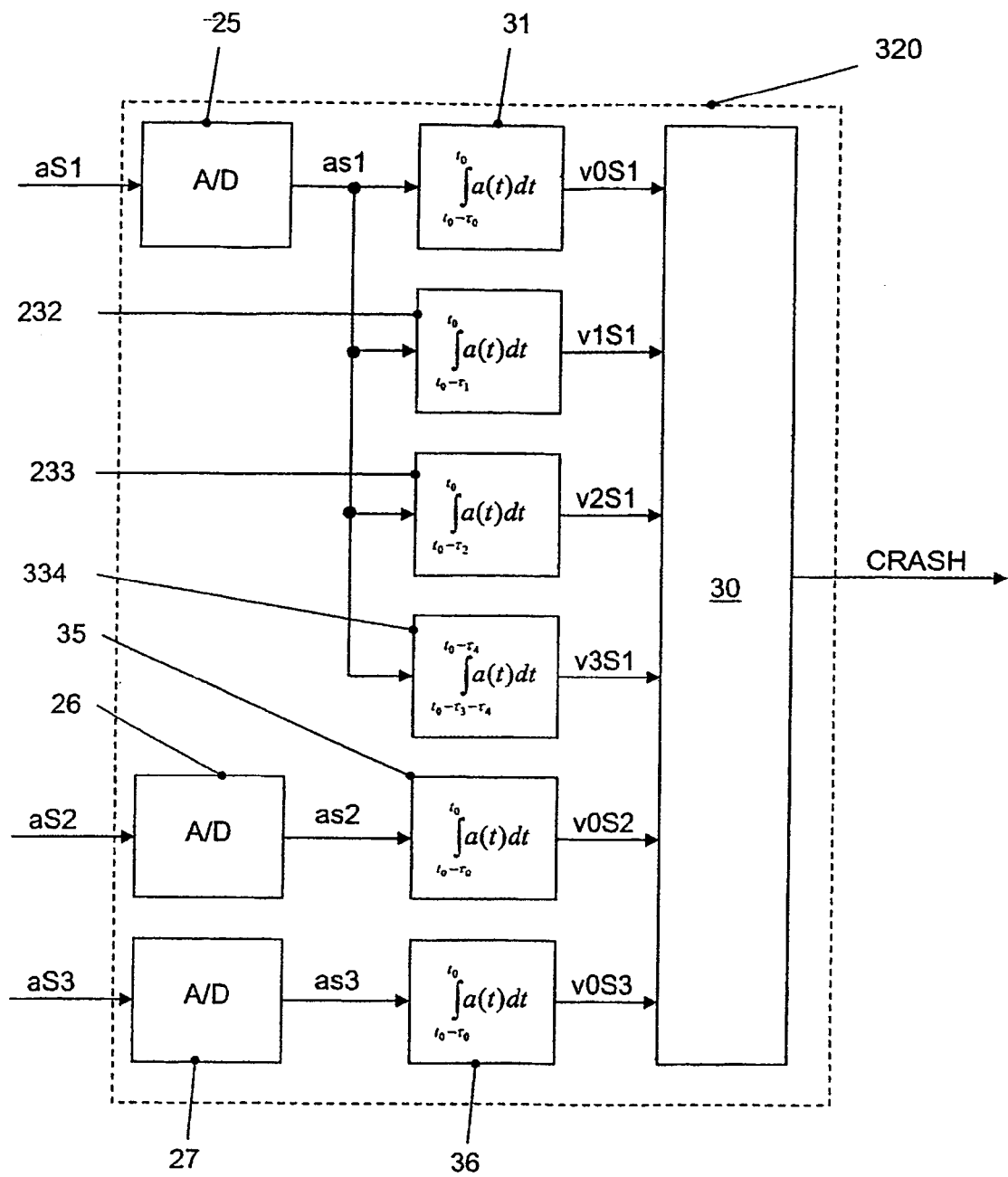
FIG. 11 illustrates an exemplary embodiment of a triggering module.

In triggering module 20 illustrated in FIG. 4 and triggering module 120 illustrated in FIG. 9, the time intervals differ in their position. However, in triggering module 220 illustrated FIG. 10, the time intervals differ in their length. It may also be provided that time intervals differ in their length and in their position. A corresponding exemplary embodiment is illustrated in FIG. 11. FIG. 11 illustrates an exemplary embodiment of a triggering module 320 that is an alternative to triggering module 220. In this context, integrator 234 is replaced by an integrator 334, with the aid of which a pseudospeed value v3S1 at a time $t_0-\tau_4$ is ascertained according to $$v3S1 = \int_{t_0-\tau_3-\tau_4}^{t_0-\tau_4} as1 \cdot dt.$$

For example, in connection with neural networks, automatically generated decision trees, or comparable, learning, evaluation procedures, particularly robust control of airbags and belt tensioners may be provided.

Although explained in the exemplary embodiments in view of airbags and belt tensioners for a frontal collision, the foregoing should not be considered to be restricted. Example embodiments of the present invention are also applicable to side airbags and other occupant protection systems. In one implementation for side airbags, crash sensors S2 and S3 may be arranged, for example, in the B-pillar. It may be provided that at least one pseudospeed value over at least one additional time interval be calculated for crash sensor S2 and/or crash sensor S3, as well.

A control unit within the present context may also be a distributed system. A control unit within the present context does not have to be accommodated in a single housing. A control unit within the present context may also be an individual chip or a printed circuit board.

To the extent that decision trees are mentioned in connection with the generation of ignition recommendation CRASH, these may also be replaced by regression trees, association tables, rule sets, supervector machines, or other machine-learning procedures, etc.

Instead of motion variables or their average values, differences of motion variables, average values of these differences, and/or differences of average values may also be used. Thus, e.g., a subtractor may be provided in front of integrators 31, 32, 33, 34, 35, 36, 232, 233, 234, and 334 illustrated in FIG. 4, FIG. 9, FIG. 10, and/or FIG. 11, so that instead of sampled acceleration values as1, as2, as3, differential values Δas1, Δas2, Δas3 are input variables of integrators 31, 32, 33, 34, 35, 36, 232, 233, 234, and 334, Δas1 being equal to difference as1–as2, Δas2 being equal to difference as1–as3, and Δas3 being equal to difference as2–as3. In addition, it may be provided that differential value Δas1 be processed in the same manner as sampled acceleration value as1 illustrated in FIG. 4, FIG. 9, FIG. 10, and/or FIG. 11, that differential value Δas2 be processed in the same manner as sampled acceleration value as1 illustrated in FIG. 4, FIG. 9, FIG. 10, and/or FIG. 11, and/or that differential value Δas3 be processed in the same manner as sampled acceleration value as2 illustrated in FIG. 4, FIG. 9, FIG. 10, and/or FIG. 11. In this case, the number of integrators and the number of input variables are to be appropriately adapted to trigger generator 30.

Differences may also be time differences. Thus, it may be provided that differential values Δas1, Δas2, Δas3 be used in place of sampled acceleration values as1, as2, as3 as input variables of integrators 31, 32, 33, 34, 35, 36, 232, 233, 234, and 334, Δas1(t) being equal to difference as1(t)–as1(t–τ), Δas2 being equal to difference as2(t)–as2(t–τ) or difference as2(t)–as3(t–τ), and Δas3 being equal to difference as3(t)–as3(t–τ) or difference as3(t)–as2(t–τ).

In accordance with above-mentioned variants with regard to the calculation of a difference, motion variables within the present context may also be differences of motion variables, when they are used as input variables.

One may proceed with pseudospeed values v0S1, v1S1, v2S1, v3S1, v0S2, v0S3 in an analogous manner. Accordingly, average values of motion variables within the present context may also be differences of average values of motion variables or average values of differences of motion variables, when they are used as input variables.

| LIST OF REFERENCE NUMERALS | |
| --- | --- |
| 1 | motor vehicle |
| 2 | control device |
| 5, 6 | leads |
| 10 | control module |
| 11 | belt sensor |
| 12 | seat-occupancy sensor |
| 14 | control element |
| 15 | airbag |
| 16 | belt tensioner |
| 20, 120, 220, 320 | triggering module |
| 21 | firing table |
| 25, 26, 27 | analog-to-digital converter |
| 30 | trigger generator |
| 31, 32, 33, 34, 35, 36, 232, 233, 234, 334 | integrator |
| 40 | time interval |
| 50, 51, 52, 53, 54, 55 | input node |
| 60, 61, 62, 63, 64, 65 | covered node |
| 70 | output node |
| 80 | decision tree |
| 81, 82, 83, 84, 85, 86, 87, 88, 89 | inquiry |
| 132, 133, 134 | lag element |
| AIR, BELT | ignition signal |
| aS1, aS2, aS3, as1, as2, as3 | acceleration value |
| CRASH | ignition recommendation |
| ONOFF | switching signal |
| MBELT | belt information |
| MSEAT | seat-occupancy information |
| S1, S2, S3 | crash sensor |
| t | time |
| t0 | current time |
| v0S1, v1S1, v2S1, v3S1, v0S2, v0S3 | pseudospeed value |
| $\tau_0, \tau_1, \tau_2, \tau_3$ | length of a time interval |

What is claimed is:

1. An occupant protection system for a motor vehicle, comprising:
- at least one crash sensor adapted to measure a motion variable of the motor vehicle;
- an occupant protection device controllable via an ignition signal; and
- a control unit adapted to ascertain the ignition signal as a function of a time average of the motion variable measured by the crash sensor over at least one first time interval.

2. The occupant protection system according to claim 1, wherein the motion variable includes acceleration.

3. The occupant protection system according to claim 1, wherein the control unit is adapted to ascertain the ignition signal as a function of a time average of the motion variable measured by the crash sensor over a second time interval different from the first time interval.

4. The occupant protection system according to claim 1, wherein the control unit is adapted to ascertain the ignition signal as a function of time averages of the motion variable measured by the crash sensor in two to twenty different time intervals.

5. The occupant protection system according to claim 1, wherein the control unit is adapted to ascertain the ignition signal as a function of time averages of the motion variable measured by the crash sensor in two to five different time intervals.

6. The occupant protection system according to claim 1, wherein the time interval is between 1 ms and 200 ms long.

7. The occupant protection system according to claim 3, wherein the time intervals are substantially the same length.

8. The occupant protection system according to claim 4, wherein at least two time intervals are staggered by between 1 ms and 50 ms.

9. The occupant protection system according to claim 4, wherein the time intervals are staggered by between 1 ms and 50 ms.

10. The occupant protection system according to claim 1, further comprising at least one additional crash sensor adapted to measure a motion variable of the motor vehicle, the control unit adapted to ascertain the ignition signal as a function of at least one time average of the motion variable measured by the additional crash sensor over a time interval.

11. The occupant protection system according to claim 1, wherein the control unit is adapted to ascertain the ignition signal in accordance with a pattern-recognition method.

12. The occupant protection system according to claim 1, wherein the control unit is adapted to ascertain the ignition signal in accordance with a pattern-recognition method and in accordance with at least one of (a) a neural network and (b) a decision tree.

13. An occupant protection system for a motor vehicle, the motor vehicle including at least one crash sensor adapted to measure a motion variable of the motor vehicle, comprising:
- an occupant protection device controllable via an ignition signal; and
- a control unit adapted to ascertain the ignition signal as a function of a time average of the motion variable measured by the crash sensor over at least one first time interval.

14. A motor vehicle, comprising:

an occupant protection system including:

at least one crash sensor adapted to measure a motion variable of the motor vehicle;

an occupant protection device controllable via an ignition signal; and a control unit adapted to ascertain the ignition signal as a function of a time average of the motion variable measured by the crash sensor over at least one first time interval.

15. A method for operating an occupant protection system for a motor vehicle, the occupant protection system including an occupant protection device controllable via an ignition signal, comprising:

ascertaining the ignition signal as a function of a time average of a measured motion variable over at least one time interval.

16. The method according to claim 15, wherein the ignition signal is ascertained in the ascertaining step in accordance with a pattern-recognition method.

17. The method according to claim 15, wherein the ignition signal is ascertained in the ascertaining step in accordance with a pattern-recognition method and in accordance with at least one of (a) a neural network and (b) a decision tree).

* * * * *